UNITED STATES PATENT OFFICE 2,407,248

METHOD FOR STABILIZING A POLYMERIZED ROSIN AND POLYMERIZED ROSIN ESTER

Joseph N. Borglin, Wilmington, Del., assignor to Hercules Powder Company, Wilmington, Del., a corporation of Delaware No Drawing. Application June 26, 1942, Serial No. 448,625

7 Claims. (Cl. 260—103)

This invention relates to a method for the production of resinous materials and more particularly to a method for dehydrogenating polymerized rosins and esters thereof.

The polymerization of rosin and rosin esters with sulfuric acid, boron fluoride, and other polymerization catalysts has been described in the art. Such polymerized rosins and rosin esters are highly valuable materials because they have increased melting points in comparison with ordinary rosin and its esters. As a result, these polymerized materials have found wide use in the preparation of improved coating compositions which dry to form much harder films than those obtainable from coating compositions prepared from ordinary rosin and esters thereof. Moreover, polymerized rosin and its esters possess a lighter color and increased color stability when subjected to the action of light, heat, etc., than rosin and rosin esters which have not been polymerized. Further important advantages and uses of polymerized rosin and its esters have been disclosed in the art.

Now, in accordance with this invention, a method has been discovered for the further improvement of the qualities of polymerized rosin and esters of polymerized rosin to provide a material of increased stability. This novel method comprises contacting a polymerized rosin or a polymerized rosin ester with from about one to about ten per cent of sulfur, based upon the weight of the polymerized rosin or polymerized rosin ester, at a temperature between about 150° and 350° C. under conditions adapted to effect substantial dehydrogenation of the rosin or rosin ester. The new product of this invention is a dehydrogenated polymerized rosin or polymerized rosin ester characterized by a bromine number below about 75 and by an increased melting point. It has been determined in accordance with this invention that by dehydrogenating a polymerized rosin or polymerized rosin ester to provide a product with a bromine number below about 75 a material of substantially increased stability is provided.

Having thus indicated in a general way the nature of this invention, the following examples are given to illustrate the method of preparing the improved polymerized rosin and polymerized rosin esters of this invention. In the specification and in the claims, the parts and per cents are by weight unless otherwise specified.

Example 1

A rosin, polymerized with 100% sulfuric acid while dissolved in benzene and having a drop melting point of 101° C., was heated under a nitrogen atmosphere until a temperature of 280° C. was attained. At this point, one and one-half per cent of sulfur, based upon the weight of the rosin, was added slowly, and the temperature was held constant at 280° C. for three hours. After this, the product was cooled. By means of this procedure, the bromine number of the polymerized rosin was reduced from 107 to 56 and the drop melting point was increased.

Example 2

A sample of the same polymerized rosin employed in Example 1 was heated under a carbon dioxide atmosphere to a temperature of 200° C., at which point one and one-half per cent of sulfur, based upon the weight of the polymerized rosin, was added. The temperature of the reaction mixture was held at 200° C. for three hours, after which the product was cooled. This procedure reduced the bromine number of the polymerized rosin to 74.

Example 3

A sample of the polymerized rosin employed in Example 1 was heated under a carbon dioxide atmosphere to a temperature of 250° C. and two per cent of sulfur, based upon the weight of the polymerized rosin, was added. The temperature of the mixture was held at 250° C. for five hours and then the reaction mixture was subjected to vacuum to remove the light ends. A product, having a drop melting point of 110° C. and a bromine number of 63, was produced.

Example 4

The glycerol ester of a sulfuric acid polymerized rosin, having a drop melting point of 110° C., was heated under a nitrogen atmosphere to 280° C., after which one and one-half per cent of sulfur was added. The temperature of the mixture was held at 280° C. for three hours and the product was then cooled. By means of this procedure, the bromine number of the ester was reduced from 82 to 48.

Thus, the improved polymerized rosin and polymerized rosin esters are provided by contacting the polymerized rosin or polymerized rosin ester with sulfur under conditions adapted to effect substantial dehydrogenation of the material. The temperature range within which the dehydrogenation may be conducted may vary within wide limits. Reaction temperatures of from 200° to 280° C. were employed in the examples, but any temperature between about 150° and about 350° C., and preferably from about 225° to about 280° C., will be found to be suitable. The amount of sulfur employed may also vary within wide limits. In the examples, the amount of elemental sulfur employed was one and one-half or two percent, based upon the weight of the polymerized rosin or polymerized rosin ester. Generally, from about one to about ten and preferably from about one to about five per cent by weight of sulfur, based upon the weight of the rosin or ester, is used as a dehydrogenating agent. The reaction time which will be found to be most suitable will vary with the particular rosin or rosin ester being dehydrogenated, with the reaction temperature, with the degree of dehydrogenation desired, and will also depend upon other obvious factors. Generally, a reaction period of not more than five hours is used.

The polymerized rosins which may be dehydrogenated in accordance with this invention may be those derived from any of the various grades of wood or gum rosin. They may be produced from such rosins by polymerization according to any of the known methods, such as by treating with various catalysts as sulfuric acid, organic substituted sulfuric acids, boron fluoride, metallic halides as stannic chloride, zinc chloride, aluminum chloride, hydrogen fluoride, or by treatment of the rosins with a high voltage, high frequency electrical discharge, or by treatment with an acid sludge formed by treatment of the rosin with sulfuric acid, such as is described in an application, Serial No. 328,864, filed April 10, 1940, by Clell E. Tyler, now U. S. Patent No. 2,288,659. The polymerized rosins which may be dehydrogenated to produce the improved products of this invention will be those having a drop melting point from about 5° to about 100° C. above the melting point of the original rosin used in the polymerization.

The polymerized rosin esters which may be dehydrogenated will include polymerized monohydric alcohol esters and polymerized polyhydric alcohol esters of rosins which have been polymerized according to any of the methods mentioned in the preceding paragraph. Thus, they will include the methyl, ethyl, propyl, butyl, ethylene glycol, propylene glycol, diethylene glycol, trimethylene glycol, glycerol, pentaerythritol, etc., esters of such polymerized rosins. Alternatively, the polymerized rosin esters may be prepared by esterifying any of the aforementioned alcohols with any wood or gum rosin and then polymerizing the ester with any of the polymerization catalysts mentioned in the preceding paragraph, according to procedures well known in the art. The polymerized rosin esters suitable for use in this invention are those having a drop melting point from about 5° to about 100° C. above the melting point of the original rosin ester employed in the polymerization.

Before being subjected to the dehydrogenation process described in this specification, the polymerized rosin or polymerized rosin ester may be subjected to a conventional heat treatment at a temperature from about 250° to about 350° C. to effect a refining of the rosin ester. The methods for conducting such a heat treatment are more fully disclosed in an application entitled "Method of refining polymerized rosin," Serial No. 371,991, filed December 27, 1940 by Raymond F. Schlaanstine and in an application, entitled "Method of refining polymerized rosin esters," Serial No. 378,056, filed February 8, 1941 by Alfred L. Rummelsburg.

The dehydrogenation process may be conducted, as shown in the examples, by contacting the polymerized rosin or polymerized rosin ester and the elemental sulfur as such. Alternatively, dehydrogenation may be effected with the polymerized rosin or ester thereof or the sulfur, or both, dissolved in a suitable inert organic solvent, such as the paraffin hydrocarbons as hexane, V. M. & P. naphtha, etc., the aromatic hydrocarbons such as benzene, toluene, xylene, etc., the mixed aromatic-alicyclic hydrocarbons as tetrahydronaphthalene, etc., the alicyclic hydrocarbons as cyclohexane, decahydronaphthalene, etc., Solvesso No. 1, 2, 3, 4, etc. Depending upon the reaction temperature and upon the vapor pressure of the solvent employed, the dehydrogenation may be conducted at atmospheric or superatmospheric pressure, and the polymerized rosin or polymerized rosin ester may be dehydrogenated by a batch or continuous process. As shown in the examples, the method of this invention is preferably conducted under an inert atmosphere, such as nitrogen or carbon dioxide, in order to produce products of the lightest color.

As shown in Example 3, the product may also be improved by subjecting the polymerized rosin to a partial vacuum distillation at the end of the reaction period in order to remove the light ends. Further improvement may also be obtained by removing the light ends through continued sparging with an inert gas, such as carbon dioxide or nitrogen, or by combination of the sparging and vacuum distillation.

The polymerized rosin and polymerized rosin ester prepared as described herein are highly useful and desirable products characterized by great stability and high melting point. Thus, these polymerized products find important use in coating compositions, adhesives, paper sizes, soaps, rubber compounds, etc., of increased resistance to oxidation and deterioration through other causes.

What I claim and desire to protect by Letters Patent is:

1. The method of stabilizing a material selected from the group consisting of polymerized rosin and polymerized rosin esters which comprises contacting the material with from about one to about ten per cent of sulfur, based upon the weight of said material, at a temperature between about 150° and about 350° C. until the bromine number of the material has become reduced to below about 75 without a decrease in its melting point.

2. The method of stabilizing a material selected from the group consisting of polymerized rosin and polymerized rosin esters which comprises contacting the material with from about one to about five per cent of sulfur, based upon the weight of said material, at a temperature between about 225° and about 280° C. until the bromine number of the material has become reduced to below about 75 without a decrease in its melting point.

3. The method of stabilizing polymerized rosin which comprises contacting the polymerized rosin with from about one to about ten per cent of sulfur, based upon the weight of the rosin, at a temperature between about 150° and about 350° C. until the bromine number of the polymerized rosin has become reduced to below about 75 without a decrease in its melting point.

4. The method of stabilizing a polymerized rosin glycerol ester which comprises contacting the ester with from about one to about ten per cent of sulfur, based upon the weight of the ester, at a temperature between about 150° and about 350° C. until the bromine number of the polymerized rosin ester has become reduced to below about 75 without a decrease in its melting point.

5. The method of stabilizing a polymerized rosin pentaerythritol ester which comprises contacting the ester with from about one to about ten per cent of sulfur, based upon the weight of the ester, at a temperature between about 150° and about 350° C. until the bromine number of the polymerized rosin ester has become reduced to below about 75 without a decrease in its melting point.

6. A method of stabilizing polymerized rosin which comprises contacting the polymerized rosin with from about one to ten per cent of sulfur, based upon the weight of the rosin, at a temperature between about 200° C. and 350° C.

7. A method of stabilizing a material selected from the group consisting of polymerized rosin and polymerized rosin esters which comprises contacting the material with from about one to ten per cent of sulfur, based upon the weight of said material, at a temperature between about 150° C. and 350° C.

JOSEPH N. BORGLIN.